V. KRICK
Aug. 2, 1932. RIGHT AND LEFT FULL FASHIONED FOOT HOSIERY Re. 18,548
Original Filed Oct. 26, 1931
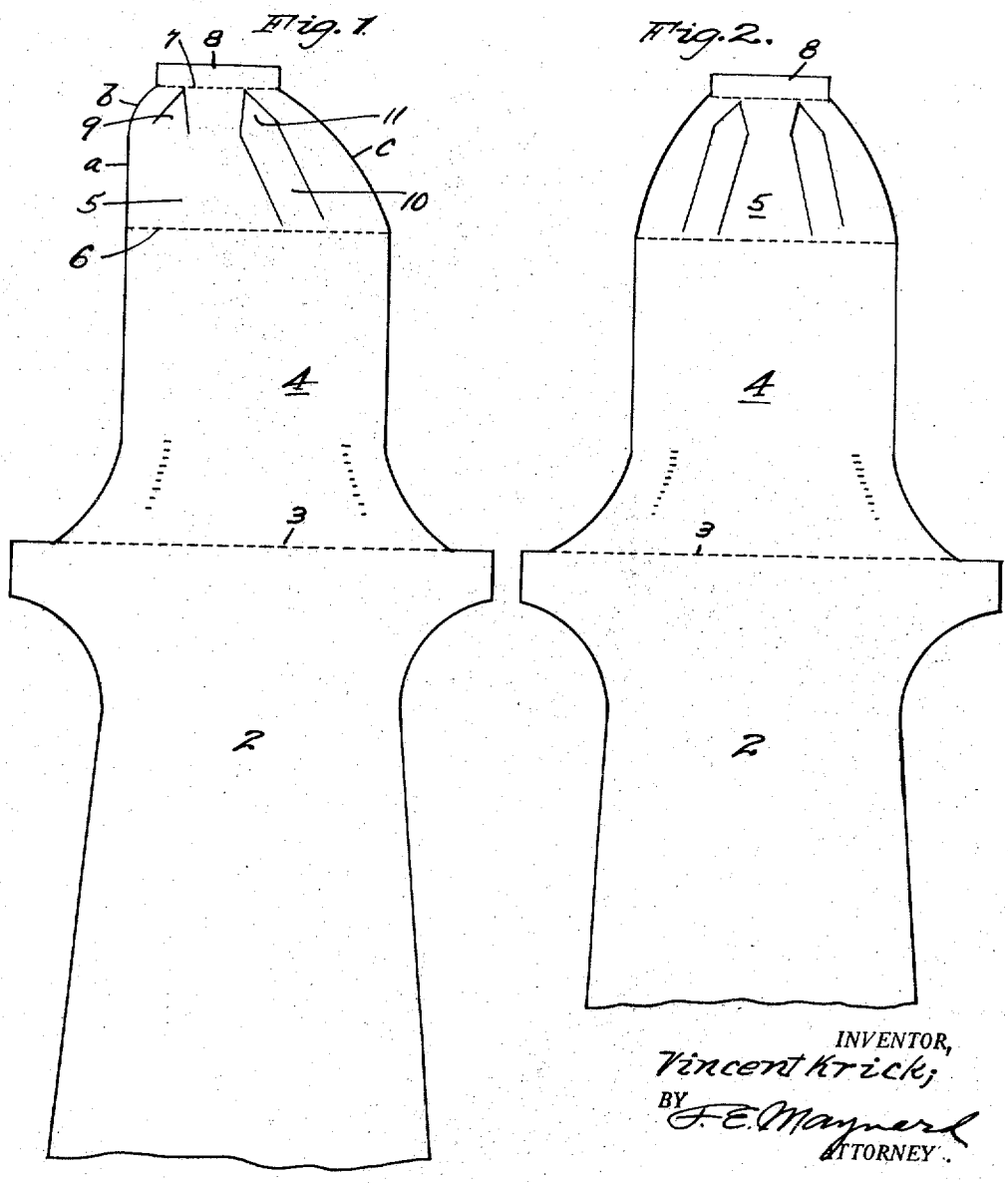
INVENTOR,
Vincent Krick;
BY F. E. Maynard
ATTORNEY.

Reissued Aug. 2, 1932 Re. 18,548

UNITED STATES PATENT OFFICE

VINCENT KRICK, OF LOS ANGELES, CALIFORNIA

RIGHT AND LEFT FULL-FASHIONED FOOT HOSIERY

Original No. 1,859,335, dated May 24, 1932, Serial No. 571,141, filed October 26, 1931. Application for reissue filed June 13, 1932. Serial No. 617,015.

Hosiery is knitted in two generally different systems one of which is by a tubular, seamless method and the other by a flat bed or full fashioned machine and it is called the full fashioned method, and to which the present invention relates.

In the production of standard, full fashioned hosiery both feet are alike. It is an object of the present invention to provide full fashioned hosiery having full fashioned feet; that is, feet made in right or left foot shape. In other words an object is to make each hose 100% full fashioned.

In the present invention the right or the left foot is set on the full fashioned leg in the usual manner along the "topping line."

The foot is knitted up to the "start of the toe" line with the same operation as the straight or standard interchangeable foot of old style. From this line the method is changed. In making the left foot the left end carrier rack and the left end narrowing machine rack are left out of operation until the toe is knitted up to the first narrowing in the diamond, then the left end carrier rack and the left end narrowing machine rack are closed to finish the foot.

When the stocking is in the machine the left side of the toe is knitted in one straight line until up to the joint of the great toe and when a great toe diamond is put in, the toe end will have a slight curve inward to fit around the end of the great toe. The great toe side is produced without any narrowing prints on the left side until up to near the "looping line" where a diamond is made.

In making the left foot the draw back which controls the large narrowing finger on the left side of the foot is set so that when the large narrowing finger makes the diamond it is not working as a draw back. For a left foot the knife is set to the left so that it is in position for making the diamond. By setting the knife to the left it is necessary to add more narrowing in the toe and this will transfer the right side of the toe to the shape of the smaller toes.

The same knife can be used or can be changed to a wider knife, as desired, for the width of the toe.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a top plan of a foot flat for a right foot hose of this full-fashioned structure.

Figure 2 is a plan of standard foot form flat to show contrast with Fig. 1.

The leg 2 is joined on the "topping line" 3 to the foot flat 4 whose body joins a toe part 5 on the "start of toe" line 6. To this extent the foot is of standard form and usual knitting method in a full-fashion knitting machine.

The novel features reside in the side lines of, and diamonds in, the toe part 5. As shown in Fig. 1, the side line *a* of the great toe side extends straight on from the start-of-toe line 6 and then bends at *b* inward about the outer end of the toe and intersects the looping line 7 which extends across the toe part and beyond which is knitted a selvage area 8 (which is trimmed off to finish the hose).

To effect the inturn at the great toe a "diamond" 9 is provided but has no "toe narrowing" zone as is shown at 10 near the little toe side. The "narrowing" zone 10 ends in a diamond 11 ending near the looping line 7.

The selvage 8 starts at the tip of the great toe curve *b* and extends toward the little toe side line *c* which bends in from the start-of-toe line 6.

Owing to the short curve *b* of the great toe side *a* the selvage is greatly offset toward the great toe side and produces a little toe curve *c* which, when the looping line 7 and toe sides are stitched to complete the stocking, will produce a full-fashioned toe.

In other words—in this full-fashioned foot the greater toe has a long straight side line and a short, corner incurve, and the little toe side is of a long and deeply inturned character.

The contrast is shown in Fig. 2, where the toe part 5 is symmetrical along both sides and the selvage 8 is centered on the toe end. A foot formed of such a toe blank is not foot fashioned but causes the toe part to pull on the inserted greater toe, causes strain in the fabric and cramps the toes. These objections are overcome by the present novel shaped foot.

In some types of machines in making the left foot the right end carrier rack and the right end narrowing machine rack are left out of operation until the toe is knitted up to the first narrowing in the diamond then the right end carrier rack and the right end narrowing machine rack are closed to finish the foot.

What is claimed is:

1. A full fashioned knitted foot for a full fashioned hose leg of the class knitted on a flat bed machine, which comprises a knitted flat whose great toe side extends straight beyond the "start of toe" line of the foot, a selvage along the end of the toe of the flat and being offset toward the great toe end and joining the toe part of the flat by a looping line, a diamond adjacent the great toe end of the looping line and the corner of said end narrowing inward along the said diamond, a little toe "narrowing" ending in a diamond and extending from the "start of toe" line of the flat obliquely toward the near end of the said selvage and the little toe side line narrowing in to the near end of the looping line.

2. A method of knitting a full fashioned foot for hosiery which consists of knitting the foot blank and continuing the knitting on one side straight past the "start of the toe line", forming a great toe diamond to narrow in the said line at about the end of the great toe side and forming a little toe narrowing and diamond inwardly from the little toe side and toward the looping line of the toe, and making an offset selvage therebeyond; the little toe side line ending closer to the center line of the foot than the great toe side line.

In testimony whereof, I have set my hand.

VINCENT KRICK.